July 22, 1947.   J. R. MILES   2,424,283
OPTICAL SYSTEM FOR TELESCOPES AND BINOCULARS
Filed Aug. 9, 1945   4 Sheets-Sheet 1
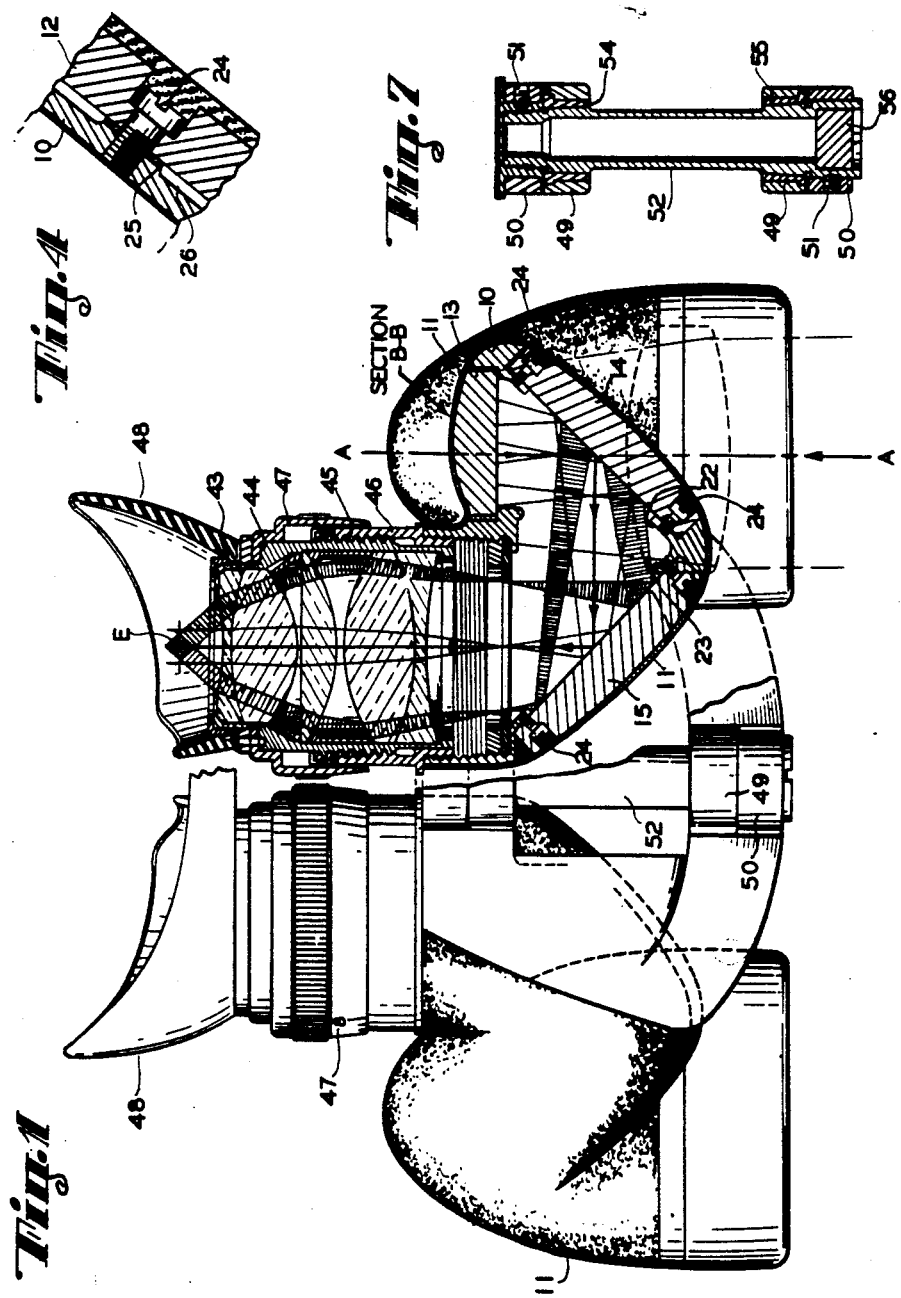
INVENTOR
JOHN R. MILES
BY C. J. Kalman
ATTORNEY

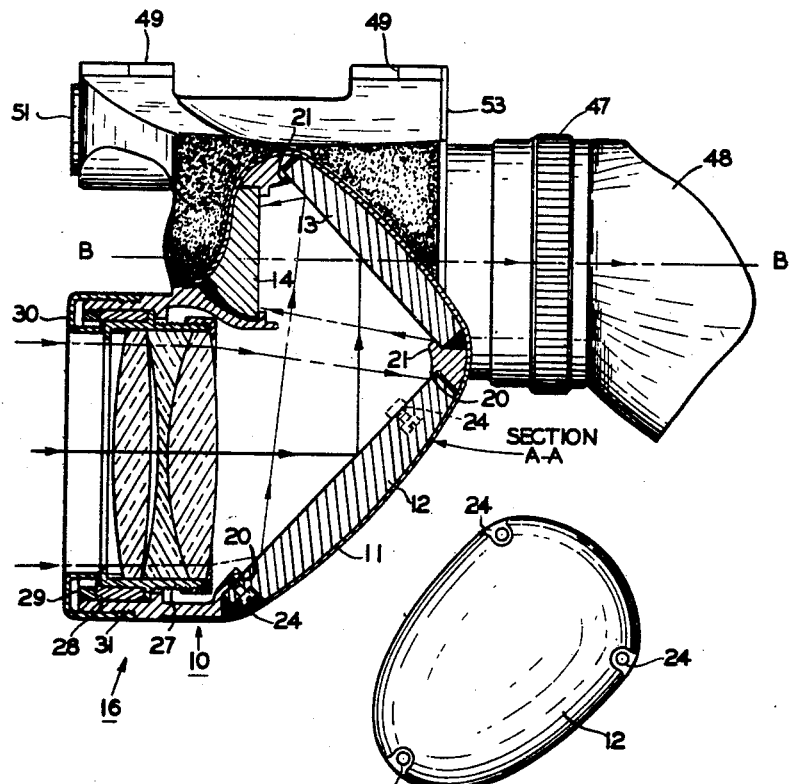

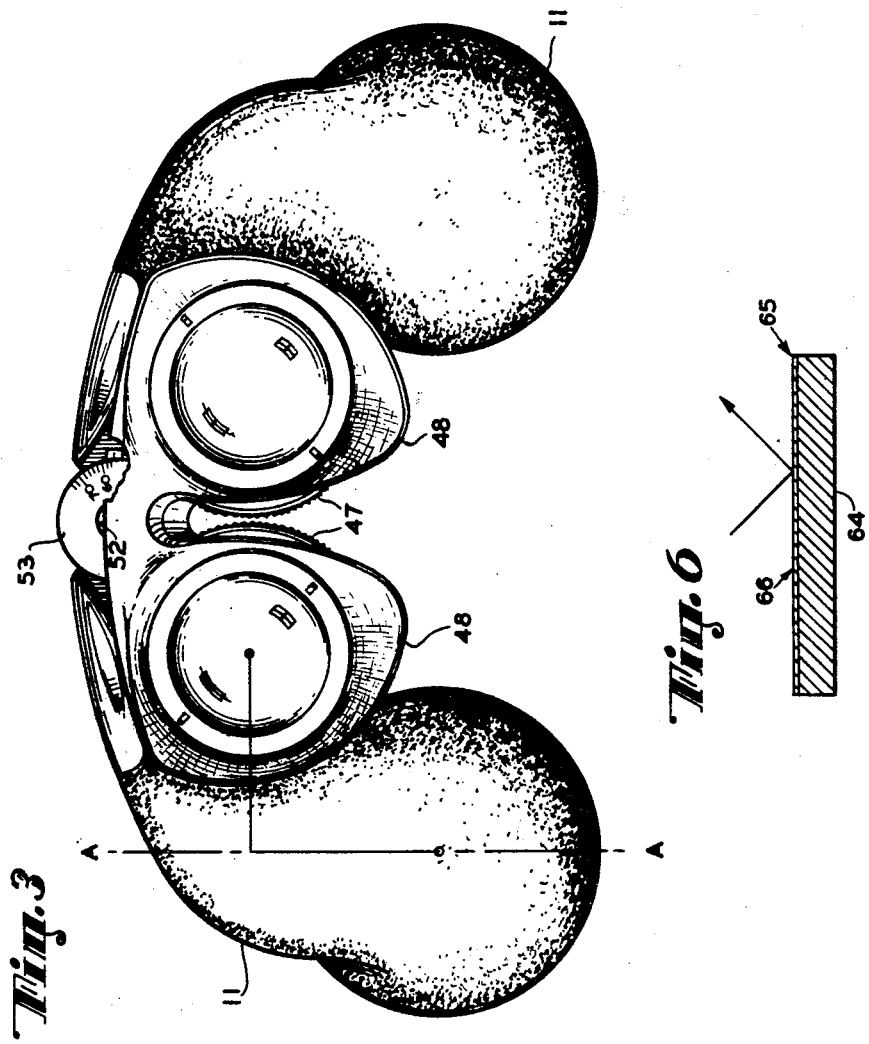

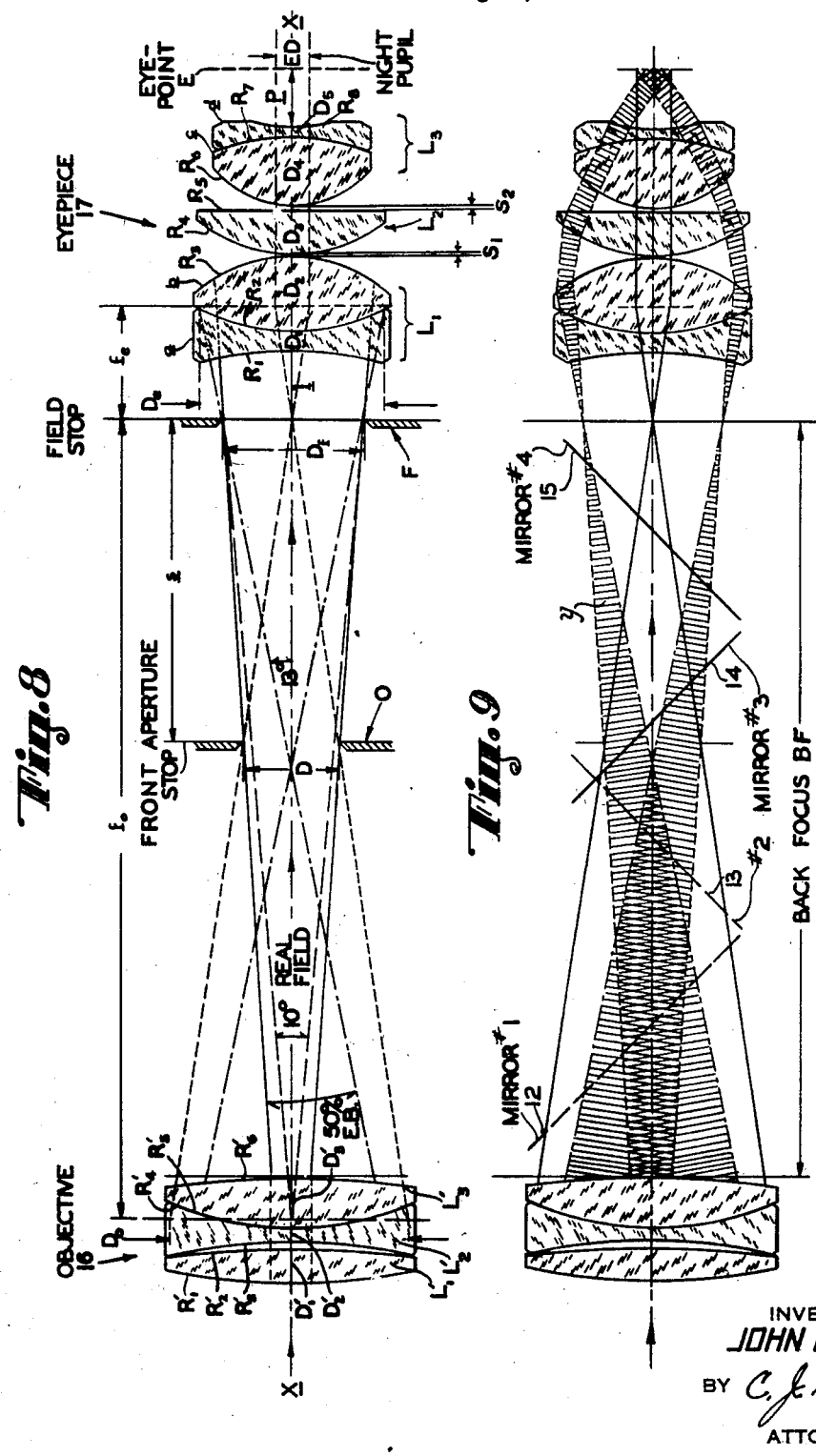

Patented July 22, 1947

2,424,283

UNITED STATES PATENT OFFICE 2,424,283

OPTICAL SYSTEM FOR TELESCOPES
AND BINOCULARS

John R. Miles, West Englewood, N. J., assignor to
Bendix Aviation Corporation, Teterboro, N. J.,
a corporation of Delaware Application August 9, 1945, Serial No. 609,748

18 Claims. (Cl. 88—32)

The present invention relates generally to optical devices and more particularly to improvements in optical devices, such as telescopes and binoculars, or the like.

Heretofore in the manufacture of optical instruments, such as telescopes and binoculars, or the like, a small visually perfect field was accepted and the reduction of the optical aberrations, except those occurring considerably away from the axis, was usually obtained principally by increasing the basic length of the instrument, prisms being ordinarily used to give an erect image as well as to shorten the overall length of the instrument back to within practicable limits. The use of prisms causes the instrument to be heavy and expensive to manufacture. In a few cases heretofore, mirrors have been used in the manufacture of optical instruments of this type, but in these cases the same general arrangement of reflecting surfaces was used as with prisms, which arrangement caused the erecting system to be so long as to prevent the attainment of highest performance of a binocular as, with such arrangement, the optimum performance with mirrors was in important respects inferior to that with prisms.

Accordingly, it is an object of the present invention to provide novel means whereby a compact light weight instrument of the class described is built and at the same time to obtain desirable optical characteristics not obtained with prior instruments while keeping all the aberrations within tolerable limits and reducing others beyond usual limits.

Another and more specific object is to provide a novel instrument for binoculars or the like, in which the housing is shaped and proportioned to form seats for a novel set of mirrors adapted to cooperate with an objective and eyepiece so as to combine in a single instrument such desirable characteristics as a large field of view, a large aperture of objective, a large bundle of light rays at the edge of the field of view, a considerable correction for astigmatism, and short basic length.

In the binocular of the present invention, a novelly short mirror-type erecting system was produced by an unconventional arrangement of the reflectors which, with its novelly short body, is disclosed and claimed in copending application, Serial No. 508,844, filed November 3, 1943.

The present application is a continuation-in-part of said copending application as well as of the common subject matter of copending applications Serial No. 501,161, filed September 3, 1943, and Serial No. 542,853, filed June 30, 1944, which respectively issued March 25, 1947, as Pat. No. 2,417,942, and April 15, 1947, as Pat. No. 2,419,151, noted in Serial No. 508,844, respectively for an objective and an eyepiece useful in such a short telescope or binocular. The eyepiece application is a continuation-in-part which replaces abandoned eyepiece application Serial No. 502,335, filed September 14, 1943.

The main invention of the subject binocular is the provision, in combination and sub-combinations, of:

1. A shorter erecting system than was heretofore considered possible;

2. A novel eyepiece of the maximum size permitted by the interpupillary distance, and with stronger refraction of its first member, to return to the eyepoint the exceptionally rapidly spreading outside rays entering the eyepiece, yet with aberrations generally within tolerable limits, than was earlier made by others; and 3. A novel objective which, mainly by flattening the field, reducing the axial zonal spherical aberration and correcting the color, cooperated to keep all of the over-all aberrations of the binocular to within tolerances for a high-grade portable binocular.

It is accordingly a principal object of the present invention to provide a telescope or binocular with a complete, radically short, optical system of high performance considering the power, large real field, and high edge-illumination, and with all aberrations kept within reasonably low tolerances for a high-grade portable instrument of this class.

A related chief object is the provision, in this combination with a novelly short erecting system and body or body, of a novel objective which is modified both to suit such shortness and to work with acceptably low over-all telescopic aberrations with an eyepiece which is also modified on account of both the stated shortness and the aberrations of said objective, the cooperation being most intimate.

A further related chief object is the provision, in this combination with a novelly short erecting system and body or body, of a novel eyepiece which is modified both to suit such shortness and to work with said objective with acceptably low over-all telescopic abberations.

Another object is to provide a novel instrument which is extremely short and includes the basic objective lens of said copending application Serial No. 501,161, which matured as Patent 2,417,942, and the eyepiece lens of said copending application Serial No. 542,853, which matured as Patent 2,417,942, in which instrument said lenses combine to correct for both lateral and longitudinal chromatic aberrations, and thereby cooperate with the novelly short body to correct for coma at a point more than half way out to the edge of the field, and for spherical aberration in the entire system.

Another object is to provide a telescope having in combination with a suitable objective and a suitable eyepiece, a novel arrangement of reflectors in a novel casing.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 shows a plan view partly in elevation and partly in cross section of a binocular or the like taken through the eyepiece at the top of the instrument, constructed in accordance with one form of the present invention.

Figure 2 is a side view, with a vertical section taken through the objective at the front of the instrument.

Figure 3 is a rear view, with the eyeguard partially broken away to show the interpupillary distance scale, of the complete instrument which is shown in the above figures.

Figure 4 is a detail sectional view of a mirror mounting.

Figure 5 is a plan outside view of the first mirror.

Figure 6 is a cross-sectional view of one form of mirror construction.

Figure 7 is a longitudinal section view of a form of hinge for binoculars or the like.

Figure 8 is a longitudinal sectional diagram of the unfolded optical system of one telescope of the binocular, giving the symbols for the essential dimensions of the lenses in particular.

Figure 9 is a generally similar diagram showing several bundles of rays passing through the telescope.

Referring to the drawings for a more detailed description of the present invention, the shell casing, or housing, 10 supports the mirrors 12, 13, 14 and 15, best shown in Figures 1 and 2.

The mirrors may be designed so that the back of each is rounded to fit and merge with the outside rounded surfaces of the shell 10 and thereby complete the curves defined thereby. Each mirror back cooperates with the outside curves and contours of the shell or casing 10 to form a foundation for the casing skin 11. The skin 11 is made of any suitable semi-flexible material for sealing the shell or casing 10, and also serves as a shock absorber to protect the interior parts of the instrument, as well as a heat insulator to provide a "warm" surface for the user's hands in cold climates.

The shell 10 which supports the mirrors may be made of any suitable material, such as aluminum or other machinable strong material, so shaped and so proportioned as to properly define the angles of the mirrors 12, 13, 14 and 15 with respect to each other for the most efficient projection of the image from the objective lens unit 16 to the eyepiece lens unit 17. Such novelly shaped casing 10 thereby eliminates the customary use of prisms for this purpose and provides for exceptional compactness in the novel combination.

The mirrors 12, 13, 14 and 15, whether made of metal or glass, are attached to shell 10 in openings consecutively arranged around the same and defined by flanges 20, 21, 22, and 23 by suitable means such as screws 24. The mirrors, if desired, may be made adjustable by any suitable means, such as by washers 25, shown in enlarged view in Figure 4, of varying thickness placed between the mirrors 12, 13, 14 and 15 and their respective supporting surfaces or flanges 20, 21, 22, 23 forming countersunk or depressed seats for the mirrors, which seating surfaces may be suitably formed. This three-point arrangement of washers 25 provides for adjustment of the mirrors to correct the manufacturing errors in the flatness of the metal supporting surfaces 20, 21, 22 and 23 of the shell body 10, which otherwise might warp the accurately polished mirror surfaces, and also provides means for adjusting the angles between the mirrors by a choice of washers of different thickness for such adjustments. Small bosses, protrusions, or pads 26 on shell 10, may be substituted for or used in addition to these washers, as also shown in Figure 4, and will give a multiple-point contact or seat for the reflecting members or mirrors with or without the washers 25, to insure proper seating of the mirrors without high accuracy required of the plane supporting surfaces or flanges 20, 21, 22, and 23 without the washers 25 and/or the bosses 26.

In addition to the novel shell structure 10, the novel arrangement of mirrors and the novel means of mounting them, the device shown in Figures 1, 2 and 3 includes an objective unit 16, and an eyepiece unit 17.

The device may be used in an inverted position from that shown in Figure 3, i. e., with the objective unit portions extending upwardly as with a periscope for use in a trench to obtain some lowering of the eyepiece lens units and of the observer's head relative to the objective lens units. However, when used as a binocular in the normal position shown in Figure 3, i. e., with the objective lens unit portions extending downwardly, the nose is accommodated between the eyepiece lens unit portions, which is preferable, and the device is more convenient to handle by grasping the side and top of the downwardly extending objective lens unit portions. Also, the device will lie better or flat against the front of the abdomen or chest of the body of a person when not in use and suspended or hung by a strap or loop from around the neck with the objective lens unit portions extending inwardly toward the body instead of outwardly, especially when the device is spread or opened out in any useful angular position of the two binocular sections as hereinafter described.

Any suitable means may be employed to mount the objective unit 16, referred to Figure 2, such as lens holder 27 and adjusting rings 28 and its threaded ring 29 which are mounted in the objective end of the shell and locked therein by U-section annulus 30 which engages 31 on the outside of shell 10. The objective lens unit 16 may take the general, or zero, form shown and described in my said copending application Serial No. 501,161. However, this is modified as hereinafter disclosed to better suit the specific body and eyepiece of the subject binocular.

The shell 10 is provided with an aperture defined by surface 20 extending upwardly and angularly across the object lens 16. Surface 20 may be countersunk from outside the shell 10 so that the back of the first mirror 12 is flush with the outside of the shell. The rounded back of the mirror in this form cooperates to provide a continuous rounded contour for outside casing skin 11 to fit over.

The second mirror supporting surface is provided for by flanges 21 so that when the second mirror 13 is seated thereon, it may for greater compactness lap over the upper edge of mirror 12 and extend angularly forward from said upper edge of mirror 12. The round back of this mirror also may merge with the outside rounded contours of shell 10.

The third mirror 14 is positioned before mirror supporting flanges 22 and extends angularly substantially perpendicularly toward the fourth mirror 15 which is positioned before and across the eyepiece lens unit 17 which is off-set from the objective aperture. Mirrors 13 and 14 also may overlap or overlie and overhang or extend beyond each other in directions normal to each other in a novel relation permitting the compactness of structure, results and advantages related. However, in the subject binocular the used reflecting surface of the first mirror 12 partially overlaps that of the fourth mirror 15 almost completely along the line of sight, i. e., two planes normal to the line of sight at the front and back edges of the used reflecting surface of the first mirror 12 are seen from Figs. 1 and 2 to include the rear half approximately of that of the fourth mirror 15.

Mirrors 14 and 15 are each similarly seated on flanges such as 22 and 23 in which their rounded back portions may conform with the outer shell contour as described with respect to mirrors 12 and 13. The foregoing arrangement may be best followed by reference to Figures 1 and 2 of the drawings in which, as shown, the eyepiece lens unit mechanism is positioned directly behind the mirror 15 in shell 10, the mirror 12 is positioned directly behind the objective mechanism in the shell and mirrors 13 and 14 are positioned in inverted angular overlapping relation to each other intermediate the mirrors 12 and 15, so as to project an image along the arrow lines, shown in Figures 1 and 2 from the objective lens 16 through the eyepiece 17 to a point E at the pupil of the operator. The reflecting surfaces of the mirrors are shown in the same manner as Porro's well known first, or Porro-one, system of plane erector reflectors. The overlapping arrangement of mirrors 13 and 14 is used to provide for greater compactness.

The eyepiece lens unit may take the form described in the above-mentioned Patent 2,417,942, and be associated with any suitable type of adjustable mounting which may comprise a mounting sleeve or bushing 44, for mounting the lenses of the eyepiece unit 17, which bushing 44 may be provided around the outer diameter with spiral threads 45, adapted to interengage with complementary threads in the interior of a fixed outer sleeve 46.

The bushing or eyepiece mount 44 may be secured to the diopter scale 47 after making adjustment to the correct diopter reading. The binoculars or the like shown in the drawings have now been described for one telescope from objective means to eyepiece means, and it is of course, understood that the opposite telescope is of the same type of construction. A suitable rubber eye-guard 48 may be fitted over the ends of the both eyepiece lens mounts 44 and secured thereto by the internally threaded sleeves 43.

Moreover, the present device is provided with a pintle-type hinge adapted to connect the binocular sections 10 together, through pintle-receiving loops 49 and 50 formed from the binocular sections.

The hinge as shown in Figure 7, comprises a tube 52 tapered at each end. A plug 53 is fastened to one of the two bodies 10 at a loop 50 by screw 51 and the tube 52 is externally threaded at an end to fit into plug 53 and contains threadless plug 56 at the other end. The tapered tube 52 may thus be moved longitudinally to frictionally engage with the other body or bushings 54 and 55 in the loops 49 to provide frictional resistance to the swivel action of the two binocular sections. This provides for frictionally retaining the two sections in any relative angular position desired for use. The end scale on plug 53, in Figure 3, shows the interpupillary distance in millimeters.

Figure 6 shows a novel construction of the mirrors such as may be used in practicing the invention. The mirrors may be made of some suitable strong base material 64, such as aluminum. The base 64 is coated with another material 65 such as chromium or anodized aluminum which is more suitable for grinding and polishing to an optical finish. If the whole of the mirror were made of this material, it would be heavy and/or difficult to machine and form; however, the aluminum base 64 may be suitably formed as by machining, forging or the like to the desired shape before plating or coating, and then plated, after which the hard surface 65 may be ground and polished to an optical finish. Numeral 66 represents a coating of some suitable high-reflecting material, such as silver or evaporated aluminum, which in turn may be protected by a thin transparent film such as aluminum oxide or quartz, or even a thin film of very resistant metal, which is so extremely thin as not to appreciably affect the reflectivity of the finished mirror.

There is thus provided a novel arrangement for binoculars or the like including a novel shell provided with outside machinable surfaces to support a plurality of mirrors shaped to merge with the outside shell contour, arranged to cooperate with suitable objective and eyepiece units to provide the most desirable characteristics of performance, while obtaining compactness, lightness and relatively simplified manufacturing features.

In Figure 8 is diagrammatically illustrated an embodiment of the present invention in which the objective 16 and the eyepiece 17 are designed, shaped, and proportioned according to the following formulas, there being included below by way of examples both the basic form of the objective of Patent 2,419,151, and its modification to suit the particular body of Serial No. 508,844 and eyepiece of Patent 2,419,151.

In these formulas, (R) is the radius of curvature of the refracting surface, (D) is the axial thickness of the lens element between the refracting surfaces, and (N$_D$) and (V) are, respectively, the refractive index for the line D of the solar spectrum and the Abbe number or well known reciprocal dispersion ratio.

*Objective.*—This comprises three elements $L_1$, $L_2$, and $L_3$ with primes for the zero-form and double-primes for the stated high performance binocular modification. An axial separation of the first two lens elements results from the specified different curvatures of their adjacent refracting surfaces which are in contact at their peripheral edges.

| Zero-form objective $f_0=100$ | | | | |
|---|---|---|---|---|
| Lens | Refractive index—$N_D$ | V | Radius | Thickness |
| $L_1'$ | 1.6110 | 58.8 | $R_1'=+80.51$ | $D_1'=3.81$ |
| $L_2'$ | 1.5795 | 41.0 | $R_2'=-132.20$ $R_3'=-74.72$ | $D_2'=1.79$ |
| $L_3'$ | 1.6110 | 58.8 | $R_4'=+38.16$ $R_5'=+38.16$ | $D_3'=6.13$ |
| | | | $R_6'=-125.28$ | |

Contact of all adjacent edges at diameter 31.51.
Back focal distance $BF'=94.74$.

*Modified objective.*—This has the elements made respectively of the same glasses but the radii and thicknesses are changed to be as follows:

| $f_0=100$ | | |
|---|---|---|
| Lens | Radius | Thickness |
| $L_1''$ | $R_1''=+80.40$ | $D_1''=3.806$ |
| $L_2''$ | $R_2''=-132.03$ $R_3''=-70.05$ | $D_2''=1.782$ |
| $L_3''$ | $R_4''=+40.42$ $R_5''=+40.42$ | $D_3''=6.128$ |
| | $R_6''=-112.74$ | |

Contact of all adjacent edges at diameter 31.51.
Back focal distance $BF''=94.86$.

*Front aperture stop.*—This stop has its diameter D and its distance s from the field stop such that $s/D<3.5$ and $s/f_e<3.5$, where $f_e$ is the equivalent focal length of the eyepiece.

*Field stop.*—This has a diameter $D_f=125.6$ for an eyepiece focal length $f_e=100$.

*Eyepiece.*—The binocular embodiment illustrated has a possible apparent field of 75° approximately of the telescopic system and consists of lenses $a$ and $b$; a plano-convex center crown lens member $L_2$; and a doublet eye lens member $L_3$ consisting of lenses $c$ and $d$, all designed and shaped according to the following formula for an approximately seven-power telescopic system.

| Lens | | $N_D$ | V | For $f_e=100$ | |
|---|---|---|---|---|---|
| | | | | Radius | Thickness |
| $L_1$ | $a$ | 1.689 | 30.9 | $R_1=-333.5$ | $D_1=17.99$ |
| | | | | $R_2=+191.0$ | |
| | $b$ | 1.611 | 58.8 | $R_2=+191.0$ | $D_2=64.97$ |
| | | | | $R_3=-134.7$ | $S_1=1.73$ |
| $L_2$ | | 1.517 | 64.5 | $R_4=+137.1$ | $D_3=37.72$ |
| | | | | $R_5=\infty$ | $S_2=1.73$ |
| $L_3$ | $c$ | 1.517 | 64.5 | $R_6=+91.29$ | $D_4=62.33$ |
| | | | | $R_7=-193.9$ | |
| | $d$ | 1.689 | 30.9 | $R_7=-193.9$ | $D_5=8.76$ |
| | | | | $R_8=+149.7$ | |

The zero-form objective, which is that most generally useful, is designed to have zero axial primary (usually called "marginal" instead of "primary") spherical aberration for D-light and yet have full color correction at a zone about seven-tenths of the way out to the edge of the objective's diameter $D_0$. This objective was modified for the binocular to produce the lowest overall aberrations near the center of the field mainly by further bending its rear member enough to correct for the eyepiece's axial primary spherical aberration, and for the objective's glasses used, the distribution of powers between the crown and flint surfaces was modified to fully correct for the eyepiece's longitudinal chromatic aberration, at a particular zone. The gain due to the modification may be appreciated when it is understood that, in the binocular, the resolution near the field's center for the zero form and for the modified objective is better than 5 and 3 seconds of arc respectively, the limit by Rayleigh's rule being $4/2=2$ seconds of arc for the binocular's 2-inch objectives.

Now that this improved binocular has been attained, an understanding of its telescopic system may be approached by the following route using rounded values for simplification of presentation. It is a highly corrected night telescope of around seven-power with 10° real field and 50 per cent edge illumination. These last two values may be balanced against each other, 10° real field being conventionally obtained by sacrificing the edge illumination. As will appear, these characteristics imposed drastic requirements on the lenses in bringing the rays back to the eyepoint from the edges of the binocular's exceptionally large apparent field of approximately 75° and still correcting the aberrations which arise with conventional systems having such severe refraction of light bundles. This binocular, by unconventional means, took advantage of this severe refraction and obtained an exceptionally large visually good field and with all aberrations within tolerances for high grade handheld binoculars, certain of the aberrations near the center of the field being far smaller than for any other known instrument of this general class and size.

The objective 16 had to be large in diameter $D_0$ (see Fig. 8), around 2-inches for around seven-power, to fill the night pupil ED of the eye (around two-sevenths of an inch) to obtain maximum brightness of image. The focal length $f_0$ of the objective is determined as follows to be around 6.6-inches starting with the approximately two-inch minimum human interpupillary distance, since the mounting takes up about 0.4-inch and, for 50 per cent edge illumination, the eyepiece diameter has to be about one-half inch larger than that of the field stop, the diameter of which is accordingly about 1.1-inch. The focal length of the objective has to be about six times the 1.1-inch diameter of the field stop, or about 6.6-inches, for the field stop to optically subtend the 10° real field.

For a 50 per cent edge bundle $y$, and an internal erecting system, e. g., mirrors 12—15 in Fig. 9, the front aperture stop distances from the field stop has to be approximately 2.5-inches. For a seven-power system, the focal length $f_e$ of the eyepiece is one-seventh of the 6.6-inch focal length of the objective or only slightly less than one-inch. By similar triangles, the diameter $D_e$ of the eyepiece is $$(2.5+1)\frac{1.1}{2.5}$$

or approximately 1.6-inch as a check and the angle of spread from the axis of the outer ray at the eyepiece used in these triangles is the angle B° whose tangent is $$\frac{1.6}{2(2.5+1)}$$

or about 13°. In other words to accommodate the 50 per cent edge bundle, the eyepiece's diameter is large relative to its focal length and the stated spread there is exceptionally great. Both of these considerations make very difficult the returning of the extreme rays to the eyeposition without very serious aberrations resulting from the eyepiece.

This 2.5-inch stop distance $s$ necks down the optical space to the small diameter D of 2.5/3.3 or about 0.75-inch, which smallness there aids in working in a Porro-one, or first Porro type, erecting system. But even with this assistance, the conventional Porro-one erecting system is too long relative to its diameter. In the binocular, the erecting system was worked in by the stated overlapping of reflectors 13 and 14 and by making each inner reflector 13, 14 smaller than its adjacent outer reflector.

Instead of being straightforward, in an actual design there is incessant tacking back and forth from one element to another with mutual adjustments so that the final values may be more or less asymptotically approached. After months or even years of this, due to the necessity for computing and comparing aberrations at each step, upon completion it is rather difficult to definitely point out and claim the particular step which resulted in the better correction of a particular aberration, cause and effect being often practically indistinguishable. And it also becomes difficult to determine positively the share of the improvement that the particular element produced. This is especially true since any reasonably short explanation such as the following must be considerably simplified, further cooperation being set forth in the claims.

Résumé

1. When the eyepiece 17 is modified as earlier stated herein, i. e., to suit the short body by having its front member $L_1$ of large diameter, all of its elements must be of large power relative to the total power of the eyepiece to refract back to the eyepoint the rapidly spreading outer rays. With such an eyepiece, and large apparent field, the rapidly spreading rays tend to produce excessive astigmatism. But when the eyepiece's members are so strongly bent as to match the eyepiece's field curvature with that of the binocular's objective, said bending together with other stated modifications so alters the eyepiece's astigmatism that the overall astigmatism of the whole system is reduced when using either the binocular's objective or a normal objective (of longer focal length) of the same field curvature.

2. The objective's field curvature was made exceptionally low relative to its focal length which slightly reduces the overall astigmatism at the edge when the eyepiece was thus bent to match the objective's field curvature. This was accomplished by the use of dense barium crown and light flint glasses in the objective chosen by the MR relation, modified (Petzval ratio) presented by the applicant in the Journal of the Optical Society of America, vol. 35, No. 7, July, 1945, pages 495–496, to produce a low curvature of the Petzval field with full chromatic correction.

3. Having chosen the objective's glasses as above, the power of the flint element $L'_2$ was taken such that the ratio of the summated power of the crown elements $L'_1$ and $L'_3$ to that of the flint is the same as that of the V's, which relation holds strictly for thin lenses, this power ratio being slightly modified for the thicknesses and separations of the elements and to produce compensation of the longitudinal chromatic aberration of the eyepiece. The zero-form took account of only the thicknesses and separations of the elements and had zero longitudinal chromatic aberration at a zone about seven-tenths of the way out from the center of the objective's aperture.

4. The overall lateral chromatic aberration was corrected by the eyepiece. This correction involved compensation for a small amount of residual lateral chromatic aberration in the objective and was accomplished by: in the eyepiece, modifying the V of the outer flint elements $a$ and $d$ to increase the V-difference between the crowns and flints, and changing the cemented radii $R_2$ and $R_7$ of the front and rear members $L_1$ and $L_3$ respectively so as to lower the ratio of the total power of the crown elements $b$, $L_2$ and $c$ to that of the flint elements $a$ and $d$.

5. The objective was such as to allow the reduction of the axial zonal spherical aberration of the objective. Having a crossed front member $L'_1$ of approximately the same power as the whole objective, and having the rear portion of the objective of low power and bent sufficiently to correct the axial primary spherical aberration of the front member produced a resulting power of better than 5 seconds of arc near the center of the field. This bending of the rear portion is carried further in the modified form than in the zero form to further improve the angular zonal spherical aberration which is already exceptionally low with the zero form and to produce a resolving power of better than 3 seconds of arc near the center of the field.

In the objective, the crossed front elements together with the airspace allowed, by the use of this low-powered rear member, the reduction of the axial zonal spherical aberration in both the zero-form and the modified form for the binocular to a very low value so that, in spite of the high zonal spherical aberration occurring in the eyepiece, the overall angular zonal spherical aberration is exceptionally low. In the modified form, the stated further bending of the objective causes the overall angular zonal spherical aberration to practically vanish with a resultant exceptionally excellent resolution near the center of the field.

6. With the binocular eyepiece of large diameter, drastic refractions and bent to match the objective's field, the coma of the eyepiece was zero at a point over halfway out in the field from the center. Consequently, the objective's coma had to be made exceptionally low to keep the overall coma within tolerable limits. This was accomplished by the portioning of the power in the front and rear crown elements and the independent bendings of the front member and the rest of the objective separately.

Thus, as appears from the foregoing explanation, there is the most intimate interaction between the objective, eyepiece, and the body, including the extremely short erecting system, which not only achieves the exceptional basic characteristics of a seven-power night binocular having a 10° real field with better than 50 per cent illumination at the edge of the field, but does this with the aberrations less in most respects, than conventional systems, and in all respects well within limits which are required for high-grade handheld binoculars.

Although the present invention is only described and illustrated in detail for one embodiment thereof, it is to be expressly understood that the same is not limited thereto. Various changes may be made in design and arrangement of the embodiment illustrated, as will be apparent to those skilled in the art. For a definition of the limits of the invention, reference should be had to the appended claims to which the following definitions apply.

In the erecting system, one reflecting surface is said to overlap a second when a portion of the second surface lies between two planes which are normal to the line of sight, i. e., the axis of the objective, and respectively touches the front and rear edges of the first surface.

The equivalent, or effective, front aperture stop O is located where the line of the uppermost ray of the bundle $y$ of rays going from the objective to the edge of the field stop F intersects the line of the uppermost ray of the bundle of rays going from the objective to the center of the field stop. For a given real field, the front aperture stop affects the edge illumination.

The Porro-one, or first Porro type, erecting system, as used in a telescope, has four reflecting surfaces 12—15 of which the first two form a first pair and the last two a second pair, each of the first and second pairs has its reflecting surfaces normal to each other, and the plane including the "optical axes" for one pair is normal to that including the "optical axes" for the other pair. The conventional Porro-one arrangement, whether for prisms or mirrors, follows that for prisms in which there is a symmetrical right-angle prism for each pair, and the two prisms are crossed, i. e., with their longest faces parallel, toward each other, and arranged in L-fashion with the longest sides of one prism normal to those of the other prism, without any overlap of the prisms themselves in the direction of the line of sight. Where a "reflector" is referred to in the claims, it is intended to be read for either a mirror or the reflecting surface of a prism since a binocular's erecting system, including that of the present invention, may be optically shortened simply by filling the optical space therein with glass as is well known.

Over-all angular primary spherical aberration (usually known as "over-all marginal spherical aberration") of a complete telescope is here defined as the angle between the marginal ray and the axis when the instrument is focused, i. e., its eyepieces are axially displaced, so that all paraxial rays, i. e., rays immediately surrounding the axis, are brought to absolute parallelism. As was occasionally done before, this over-all angular primary spherical aberration is brought substantially to zero by introducing an axial primary spherical aberration into the objective which has a negative value numerically equal to the positive axial primary spherical aberration in the eyepiece.

This axial primary spherical aberration for either the objective or the eyepiece is defined as the linear distance on the axis between the intersections with the axis of the marginal ray and the paraxial rays, the positive direction being taken from the paraxial intersection toward the unit involved.

The over-all angular zonal spherical aberration, i. e., for the whole telescope, as used in the claims, is defined as the maximum angle which any ray in the central bundle leaving the eyepiece makes with the axis when the over-all angular primary spherical aberration is equal to zero.

The bendings, of the member in the eyepiece, stated in the claims are relative to those in the basic Erfle design of U. S. Patent 1,478,704 to Erfle.

Also in the claims, V is the well-known Abbe number or reciprocal dispersion ratio.

I claim:

1. A telescope of around seven-power, for optical instruments of the class including binoculars, having an objective and an eyepiece with a generally double-truncated-conical optical space required before the latter is folded, a first Porro type erecting system having four reflectors, a field stop, and a housing operatively connecting them all, characterized in that: said housing defines an equivalent front aperture stop diameter D at an optical distance $s$ from the field stop such that $s/D<3.5$ and $2.5<f_0/s<3.25$, where $f_0$, the objective's focal length, is approximately 6.5", and the real field is not less than substantially the angle optically subtended at the objective's rear nodal point by the diameter D; said erecting system has the reflectors so arranged that the actual mechanical length of the portion of the unfolded optical space including only the reflector's used-surface-areas is less than substantially 3.5 times the maximum diameter of said portion, whereby the optical system is made shorter than the length of an unmodified but otherwise similar Porro system of the first type; said objective has the edges of all adjacent elements touching and consists of at least two members with each crown element of dense barium crown glass and each flint element of light flint glass, with a stronger than $\tfrac{1}{10}f_0$ air-lens between the front member and the next member, the front member being positive and having its power numerically greater than 5.5 times that of the objective's complemental portion, and the objective has a positive rear surface with its radius less than $1.5f_0$; and said eyepiece has a focal length $f_e$ such that $0.8''<f_e<1.1''$, a maximum working diameter $D_e$ of its front member such that $1.5<D_e/f_e<2.0$, and is of the Erfle type modified to have the edges of the outer members strongly bent outwardly and that of the central member strongly bent to the rear.

2. In a telescope of around seven power, for optical instruments of the class including binoculars, which has an objective and an eyepiece with a generally double-truncated-conical optical space required before the latter is folded, and a field stop, the combination of a first Porro type erecting system having four reflectors with a housing constructed to be capable of operatively connecting them all, characterized in that: said housing defines an equivalent front aperture stop diameter D at an optical distance $s$ from the field stop such that $s/D<3.5$ and $2.5<f_0/s<3.25$, where the objective's focal length is $f_0$, and the real field is not less than substantially the angle optically subtended at the objective's rear nodal point by the diameter D; and said erecting system has the reflectors so arranged that the actual mechanical length of the portion of the unfolded optical space including only their used-surface areas is less than substantially 3.5 times the maximum diameter of said portion, whereby the optical system is made shorter than the length of an unmodified but otherwise similar Porro system of the first type.

3. A telescope of around seven-power, for optical instruments of the class including binoculars, having an objective and an eyepiece with a generally double-truncated-conical optical space required before the latter is folded, a first Porro type erecting system having four reflectors, a field stop, and a housing operatively connecting them all, characterized in that: said housing defines an equivalent front aperture stop diameter D at an optical distance $s$ from the field stop such that $s/D<3.5$ and $2.5<f_0/s<3.25$, where the objective's focal length is $f_0$, and the real field is not less than substantially the angle optically subtended at the objective's rear nodal point by the diameter D; said erecting system has the reflectors so arranged that the actual mechanical length of the portion of the unfolded optical space including only their used-surface-areas is less than substantially 3.5 times the maximum diameter of said portion, whereby the optical system is made shorter than the length of an unmodified but otherwise similar Porro system of the first type; and said objective has the edges of all adjacent elements touching and consists of at least two members with each crown element of high-index, or dense barium crown, glass and each flint element of light flint glass, with a stronger than $\frac{1}{15}f_0$ air-lens between the front member and the next member, the front member being positive and having a power numerically greater than 5.5 times that of the objective's complemental portion, and the objective has a positive rear surface with its radius less than $1.5f_0$.

4. A telescope of around seven-power, for optical instruments of the class including binoculars, having an objective and an eyepiece with a generally double truncated-conical optical space required when the latter is unfolded, a first Porro type erecting system having four reflectors, a field stop, and a housing operatively connecting them all, characterized in that: said housing defines an equivalent front aperture stop diameter D at an optical distance $s$ from the field stop such that $s/D<3.5$ and $2.5<f_0/s<3.25$, where the objective's focal length is $f_0$, and the real field is not less than substantially the angle subtended at the objective's rear nodal point by the diameter D; said erecting system has the reflectors so arranged that the actual mechanical length of the portion of the unfolded optical space including only their used-surface-areas is less than substantially 3.5 times the maximum diameter of said portion, whereby the optical system is made shorter than the length of an unmodified but otherwise similar Porro system of the first type; and said eyepiece has a focal length $f_e$ such that $0.8''<f_e<1.1''$, a maximum working diameter $D_e$ of its front member such that $1.5<D_e/f_e<2.0''$, and is of the Erfle type modified to have the edges of the outer members strongly bent outwardly and that of the central member strongly bent to the rear.

5. A telescope, for optical instruments of the class including binoculars, having an objective and an eyepiece, a first Porro type erecting system having four reflectors, a field stop, and a housing operatively connecting them all, characterized in that: said erecting system has the reflectors so arranged that at least the second and third of the reflecting used-surface-areas overlap in the direction of the line of sight, whereby the telescope is made more compact and may be of lighter weight than with an otherwise similar first Porro type erecting system; said objective has the edges of all adjacent elements touching and consists of at least two members with each crown element of high-index, or dense barium crown, glass and each flint element of light flint glass, with a stronger than $\frac{1}{15}f_0$ air-lens between the front member where $f_0$ is the objective's focal length, and the next member, the front member being positive and having its power numerically greater than 5.5 times that of the objective's complemental portion, and the objective has a positive rear surface with its radius less than $1.5f_0$; and said eyepiece has a focal length $f_e$ such that $0.8''<f_e<1.1''$, a maximum working diameter $D_e$ of its front member such that $1.5<D_e/f_e<2.0$, and is of the Erfle type modified to have the edges of the outer members strongly bent outwardly and that of the central member strongly bent to the rear.

6. A night telescope of around seven-power, for optical instruments of the class including binoculars, having an objective and an eyepiece with a generally double-truncated-conical optical space required before the latter is folded, a first Porro type erecting system having four mirrors, a field stop, and a housing connecting them all, characterized in that: the objective has a focal length $f_0$ of less than 3.5 times its maximum used diameter and has said diameter so large that the exit pupil fills the night pupil of the human eye, consists of at least two members, and has a stronger than $\frac{1}{15}f_0$ air-lens; the eyepiece has a maximum used diameter of its front member of substantially 1.75 times the focal length of the eyepiece and is of the Erfle type modified to have the edges of the outer members strongly bent outwardly and the central member strongly bent to the rear; and, with the stated speed and diameter of the objective and the stated diameter of the eyepiece, the housing is so short and includes such a front aperture stop that it, with the field stop, so stops down the optical space as to produce a real field of at least 10° substantially with at least 50 per cent substantially edge illumination or equivalent performance, and the erecting system is arranged to have at least the second and third of its mirrors overlap in the direction of the line of sight, whereby said erecting system is shorter than an otherwise similar first Porro type erecting system and can be fitted into the available optical space.

7. A night telescope of around seven-power, for optical instruments of the class including binoculars, having an objective and an eyepiece with a generally double-truncated-conical optical space required before the latter is folded, a first Porro type erecting system having four mirrors, a field stop, and a housing connecting them all, characterized in that: with an objective which has a focal length of less than 3.5 times its maximum used diameter and has said diameter so large that the exit pupil fills the night pupil of the human eye, and with an eyepiece which has a maximum used diameter of its front member of substantially 1.75 times the focal length of the eyepiece, the housing is so short and includes such a front aperture stop that it, with the field stop, so stops down the optical space as to produce a real field of at least 10° substantially with at least 50 per cent substantially edge illumination or equivalent performance, and the erecting system is arranged to have at least the second and third of its mirrors overlap, whereby said erecting system is shorter than an otherwise similar first Porro type erecting system and can be fitted into the available optical space.

8. A telescope of around seven-power, for optical instruments of the class including binoculars, having an objective and an eyepiece with a generally double-truncated-conical optical space required before the latter is folded, a first Porro type erecting system having four mirrors, a field stop, and a housing connecting them all, characterized in that: the objective has a focal length of less than 3.5 times its maximum used diameter and has said diameter so large that the exit pupil fills the night pupil of the human eye, the eyepiece has a maximum used diameter of its front member of substantially 1.75 times the focal length of the eyepiece, and is of the Erfle type modified to have the edges of the outer members strongly bent outwardly and the central member strongly bent to the rear; and, with the stated speed and diameter of the objective and the stated diameter of the eyepiece, the housing is so short and includes such a front aperture stop that it, with the field stop, so stops down the optical space as to produce a real field of at least 10° substantially with at least 50% substantially edge illumination or equivalent performance, and the erecting system is arranged to have at least the second and third of its mirrors overlap, whereby said erecting system is shorter than an otherwise similar first Porro type erecting system and can be fitted into the available optical space.

9. A telescope of around seven-power, for optical instruments of the class including binoculars, having an objective and an eyepiece with a generally double-truncated-conical optical space required before the latter is folded, a first Porro type erecting system having four mirrors, a field stop, and a housing connecting them all, characterized in that: the objective has a focal length $f_0$ of less than 3.5 times its maximum used diameter and said diameter so large that the exit pupil fills the night pupil of the human eye, consists of at least two members, has a stronger than $\frac{1}{10}f_0$ air-lens, and is modified so that its Petzval field radius is greater than 1.6 times its focal length, the housing is so short and includes such a front aperture stop that it, with the field stop, so stops down the optical space as to produce a real field of at least 10° substantially with at least 50 per cent substantially edge illumination or equivalent performance, and the erecting system is arranged to have at least the inner two of its mirrors overlap, whereby said erecting system is shorter than an otherwise similar first Porro type erecting system and can be fitted into the available optical space; and the eyepiece has a maximum used diameter of its front member of substantially 1.75 times the focal length of the eyepiece and is of the Erfle type modified to have the edges of the outer members so strongly bent outwardly and the central member so strongly bent to the rear that, cooperating with eyepiece's very short focal length and relatively large diameter, there is a reduction in the astigmatism of the telescopic system.

10. An approximately seven-power night telescope of at least 10° real field and 50% edge illumination or substantially equivalent performance, having an objective and an eyepiece with a double-truncated-conical optical space required between them before said space is folded, a first Porro type erecting system, a field stop, and a housing operatively connecting them all, characterized in that: the objective is so large in diameter that its image, produced by the eyepiece at the eye fills the night pupil of the eye, it is faster than F:3.5, it has the field curvature radically reduced while producing full color correction, it is highly corrected for both coma and axial zonal spherical aberration, it is modified to materially compensate for the corresponding aberrations of the eyepiece which are affected by the short focal lengths and large diameters of the eyepiece's first two members and the drastic bending of all of the eyepiece's members, and it has the difference between its equivalent focal length and back focal length reduced to assist in making room for the erecting system; the unfolded optical space within the housing is so short as a result of the high speed of the objective as to make it impossible to insert any conventional erecting system therein while retaining the stated performance; the erecting system is shortened by being constructed and arranged to have its third reflecting surface's used area the smallest and located substantially as close to the field stop as the fourth reflecting surface permits to there constitute an equivalent front aperture stop or neck for the double-truncated-conical optical space with a consequently short front aperture stop distance, 3.5 being greater than the ratio of the length to the maximum diameter of the stated-shaped volume which includes only the used reflecting surface areas; and the eyepiece has more than two members, the eyepiece's first two members are both of short focal length and large used diameter, as aforementioned, as required by said short front aperture stop distance, and the edges of both of the eyepiece's outer members are drastically bent outwardly and of its central member to the rear to substantially match the eyepiece's field curvature to the objective's partially flattened field, the stated short focal lengths and large diameters cooperating with said bending to reduce the astigmatism of the telescope.

11. An approximately seven-power night telescope of at least 10° real field and 50% edge illumination or substantially equivalent performance, and having an objective and an eyepiece with a double-truncated-conical optical space required between them before said space is folded, a first Porro type erecting system, a field stop, and a housing operatively connecting them all, characterized in that: the objective is so large in diameter that its image produced by the eyepiece at the eye fills the night pupil of the eye, is faster than F:3.5, has the field curvature relatively low while producing full color correction, is highly corrected for coma, and is so highly corrected for axial zonal spherical aberration as to materially reduce the overall angular zonal spherical aberration, and also is modified to materially compensate for the other aberrations of the eyepiece which are affected by the short focal lengths and large diameters of the eyepiece's first two members and the drastic bending of all of the eyepiece's members; the unfolded optical space within the housing is so short as a result of the high speed of the objective as to make it impossible to insert any conventional erecting system therein while retaining the stated performance; the erecting system is shortened by being constructed and arranged to have its third reflector the smallest, overlap the first reflector, and located substantially as close to the field stop as the fourth reflector permits to constitute an equivalent front aperture stop or neck at the third reflector for the double-truncated-conical optical space with a consequently short front aperture stop distance; and the eyepiece has more than two members, the eyepiece's first two members are of short focal length and large used diameter as aforenoted as required by the short front aperture stop distance, and the edges of both of the eyepiece's outer members are drastically bent outwardly and each inner member means to the rear to substantially match the objective's partially flattened field.

12. A telescope comprising, in combination, an eyepiece which has a focal length less than 3.5 times the exit pupil diameter and comprises a plurality of members which are all drastically bent, with the edge of an inner member bent drastically to the rear, to allow the use of a distance of the front aperture stop from the field stop of less than 3.5 times the focal length of the eyepiece, which bending produces a very large primary spherical aberration and consequently a generally proportionally large positive axial zonal spherical aberration of the eyepiece; and an objective of crown and flint glasses, which has all adjacent element-edges touching and includes a first member which has a power substantially 1.25 times the power of the whole objective, said first member being bent to bring its edge to the rear to greatly reduce its positive axial primary spherical aberration and made of glass or glasses having such a high average reciprocal dispersion ratio V as to reduce the chromatic aberrations of said front member, and the rest of the objective is made of at least two glasses so chosen together with the glass or glasses of the front member as to increase the Petzval field's radius of curvature of the whole objective to over 1.6 times the objective's focal length and to have such a distribution of power of the crown and flint elements and such a large V-difference between the crown and flint glasses as to so over-correct the longitudinal chromatic aberration of said rest of the objective as to fully compensate for both the eyepiece's longitudinal chromatic aberration and the first member's already low longitudinal chromatic aberration to thus fully correct the telescope's longitudinal chromatic aberration at a particular zone of the aperture, and said rest of the objective is bent to bring the edge forward to produce a negative axial primary spherical aberration of said rest of the objective substantially equal numerically to the sum of the positive axial primary spherical aberrations of the eyepiece and of the first member of the objective, the stated bending being such that the stated axial primary spherical aberrations of both parts of the objective are made so small as to generally proportionally reduce any residual axial zonal spherical aberration of the objective to such a very small amount as to so reduce the over-all angular zonal spherical aberration of the complete telescope as to produce an over-all resolving power of within 1.5 times the theoretical limiting angle for the complete telescope.

13. In a telescope, the combination with an Erfle-type eyepiece having a maximum working diameter of substantially 1.75 times its focal length, a front aperture stop distance from the field stop of less than 3.5 times said focal length, and comprises three members with the central member substantially plano-convex with the convex side toward the front to tend to reduce the considerable amount of coma accompanying said drastic requirements to within a tolerable amount, and with the edges of the outer members bent outwardly; of an objective of low coma having at least two members with all of their adjacent edges in contact, with the front member having substantially 1.25 times the power of the whole objective, the front member bent to bring its edge toward the rear to minimize its coma and the rest of the objective bent to bring its edge toward the front to minimize the coma of the whole objective, and including a crown glass element at the rear having substantially 1.75 times the power of the front member, whereby the overall coma of the telescopic system is tolerable.

14. A telescopic system comprising, in combination, an objective comprising at least three elements, with all elements touching at adjacent edges and an overall thickness of less than one-half the used diameter of the objective, said elements being constructed of crown and flint glasses substantially A and B respectively to have the difference of the V-values greater than 17.5, to have such power that $$\left(\frac{P_A}{P_B}+\frac{V_A}{V_B}\right) < 0.010$$

and to have $$\frac{1}{V_A - V_B} \times \left[\frac{V_A}{N_A} - \frac{V_B}{N_B}\right] < 0.65$$

in which the Abbe number V is the reciprocal dispersion-ratio, N is the refractive index for the line (D) of the solar spectrum, and P is the total power of all lenses of glass A or B; and an Erfle-type eyepiece having the glasses selected to increase the average V-difference between its crown and flint elements and to increase the radii of the cementable surfaces to tend to lower the numerical value of the ratio of the total power of the crown elements to that of the flint elements to substantially correct its lateral chromatic aberration and constructed to have the distance of its front aperture stop to its image plane not more than three and one-half times the focal length of said eyepiece, a strongly meniscus front member nearest the incident light with its concave surface facing the incident light and having its thickness greater than two-thirds of its said focal length and its power between one-fifth and one-third of the total power of said telescopic system, a substantially plano-convex central member with its substantially planar surface away from the incident light and having its thickness greater than one-third of said eyepiece's focal length, and its power between one-third and one-half of the total power of said telescopic system, and a second strongly meniscus rear member containing a front convergent element and a rear divergent element and having its thickness greater than one-half of said eyepiece's focal length and its power between one-eighth and one-sixth of the total power of said telescopic system, the stated bending of said members being such as to substantially correct the field curvature of the whole device.

15. A night telescope for binoculars having approximately seven-power with substantially 10° real field and 50 per cent edge bundle or equivalent performance, having an objective, an eyepiece, a first Porro type internal erecting system, and a body operatively connecting them all, characterized in that: the space available for the erecting system has an actual mechanical length of less than 3.5 times the objective's aperture; the erecting system has each of its outer reflectors larger than its adjacent inner reflector; the objective has the V of the glasses of its crown and flint elements respectively approximately equal to 59 and 41 and the summated powers of the crown and the flint surfaces respectively substantially equal to 3.25 and 2.25 times the total power of the objective, whereby the objective fully corrects the residual longitudinal chromatic aberration of the eyepiece at a zone well away from the center of the field; the eyepiece has the average V's of its crown and flint elements respectively substantially 62 and 31, and has the summated powers of the crown and the flint surfaces respectively substantially equal to 1.6 and 1.1 times the power of the eyepiece, whereby the eyepiece fully corrects the residual lateral chromatic aberration of the objective at a point in the field well away from the field's center; the objective has a crossed front member of substantially 1.25 times the power of the whole objective, whereby said member in cooperation with the complemental powers and opposite bendings of the rest of the objective's elements as reduces the overall angular zonal spherical aberration of the telescope that the overall resolving power is better than 3 seconds of arc, and the primary and zonal coma are reduced by said bendings and powers to sufficiently allow for the otherwise high overall coma for the complete instrument; and the objective is composed of elements of dense barium crown and light flint glass so small that the Petzval sum is whereby the radius of curvature of the Petzval field is more than 1.6 times the objective's equivalent focal length; whereby the field curvature and astigmatism of the objective are greatly reduced, and the eyepiece has three members with the edges of its outer members drastically bent outwardly and the edges of its central member drastically bent to the rear, the bendings being such as to cause the eyepiece's field to substantially match that of the objective.

16. A telescopic system of around seven-power, comprising an objective, front aperture stop, field stop, and eyepiece according to the following formula: the objective comprises three elements $L'_1$, $L'_2$, and $L'_3$ with primes for the zero-form, with an axial separation of the first two lens elements resulting from the specified different curvatures of their refracting surfaces which are in contact at their peripheral edges, and constructed in accordance with the following formula in which the objective's focal length $f_0$, is taken as 100 units,

| Lens | Refractive index—$N_D$ | V | Radius | Thickness |
|---|---|---|---|---|
| $L_1'$ | 1.6110 | 58.8 | $R_1'=+80.51$<br>$R_2'=-132.20$ | $D_1'=3.81$ |
| $L_2'$ | 1.5795 | 41.0 | $R_3'=-74.72$<br>$R_4'=+38.16$ | $D_2'=1.79$ |
| $L_3'$ | 1.6110 | 58.8 | $R_5'=+38.16$<br>$R_6'=-125.28$ | $D_3'=6.13$ | with contact of all adjacent edges at a diameter of 31.51 and a back focal distance $BF'$ of 94.74; the front aperture stop has its distance $s$ from the field stop such that $s/D<3.5$ and $s/f_e<3.5$, where $D$ is the front aperture stop's diameter and $f_e$ is the equivalent focal length of the eyepiece; the field stop has a diameter $D_f$ such that $D_f/f_e=1.25$ substantially; and the eyepiece has a possible apparent field of substantially 75° and a front member $L_1$ consisting of lenses $a$ and $b$, a plano-convex center crown lens member $L_2$, and a doublet eye lens member $L_3$ consisting of lenses $c$ and $d$, according to the following formula:

| Lens | | $N_D$ | V | For $f_e=100$ | |
|---|---|---|---|---|---|
| | | | | Radius | Thickness |
| $L_1$ | $a$ | 1.689 | 30.9 | $R_1=-333.5$<br>$R_2=+191.0$ | $D_1=17.99$ |
| | $b$ | 1.611 | 58.8 | $R_2=+191.0$<br>$R_3=-134.7$ | $D_2=64.97$ |
| | | | | | $S_1=1.73$ |
| $L_2$ | | 1.517 | 64.5 | $R_4=+137.1$<br>$R_5=\infty$ | $D_3=37.72$ |
| | | | | | $S_2=1.73$ |
| $L_3$ | $c$ | 1.517 | 64.5 | $R_6=+91.29$<br>$R_7=-193.9$ | $D_4=62.33$ |
| | $d$ | 1.689 | 30.9 | $R_7=-193.9$<br>$R_8=+149.7$ | $D_5=8.76$ | with the working diameter of the front member $L_1$ substantially equal to 180.

17. A telescopic system as set for in claim 16 in which the objective is modified to conform to the following formula, in which the double primes indicate that the values are for the modified form, again taking the objective's focal length as 100 units and using the same glasses for the respective elements:

| Lens | Radius | Thickness |
|---|---|---|
| $L_1''$ | $R_1''=+80.40$<br>$R_2''=-132.03$ | $D_1''=3.806$ |
| $L_2''$ | $R_3''=-70.05$<br>$R_4''=+40.42$ | $D_2''=1.782$ |
| $L_3''$ | $R_5''=+40.42$<br>$R_6''=-112.74$ | $D_3''=6.128$ | with contact of all adjacent edges at a diameter of 31.51 and a back focal distance $BF''$ of 94.86.

18. A night telescope having an objective, an eyepiece, and a body operatively connecting the objective and eyepiece, characterized in that: the objective is constructed of crown and flint elements such that the V of the glasses of its crown and flint elements respectively substantially equal to 59 and 41 and its elements are constructed to have the summated powers of the crown and the flint surfaces respectively substantially equal to 3.25 and 2.25 times the total power of the objective, whereby the objective fully corrects the residual longitudinal chromatic aberration of the eyepiece at a zone well away from the field's center; the eyepiece is constructed of crown and flint elements to have their average V's respectively substantially 62 and 31, and to have the summated powers of the crown and the flint surfaces respectively substantially equal to 1.6 and 1.1 times the total power of the eyepiece, whereby the eyepiece fully corrects the residual lateral chromatic aberration of the objective at a point in the field well away from the field's center; the objective has a crossed front member of substantially 1.25 times the power of the whole objective, whereby the front member cooperates with the complemental powers and stated bendings of the rest of the objective's elements to so reduce the overall angular zonal spherical aberration of the telescope that the overall resolving power is better than 3 seconds of arc, and the primary and zonal coma are reduced by said bendings and powers to sufficiently allow for the otherwise high overall coma for the complete instrument; and the objective is composed of elements of dense barium crown and light flint glass whereby the Petzval sum is so small that the radius of curvature of the Petzval field is more than 1.6 times the equivalent focal length, whereby the field curvature and astigmatism of the objective are greatly reduced; and the eyepiece has three members with the edges of its outer members drastically bent outwardly and the edges of its central member drastically bent to the rear, the bendings being such as to cause the eyepiece's field to substantially match that of the objective.

JOHN R. MILES.

REFERENCES CITED

The following references are of record in the file of this patent:

UNITED STATES PATENTS

| Number | Name | Date |
|---|---|---|
| 1,892,893 | Karnes | Jan. 3, 1933 |
| 2,135,531 | Reichert | Nov. 8, 1938 |
| 765,607 | Aitchison | July 19, 1904 |
| 2,015,527 | Konig | Sept. 24, 1935 |
| 918,147 | Hastings | Apr. 13, 1909 |
| 415,040 | Hastings | Nov. 12, 1889 |
| 1,584,272 | Bertele | May 11, 1926 |

FOREIGN PATENTS

| Number | Country | Date |
|---|---|---|
| 3,596 | Great Britain | Feb. 16, 1903 |
| 166,575 | Great Britain | July 11, 1921 |
| 22,276 | Great Britain | Nov. 10, 1914 |
| 343,228 | Great Britain | Feb. 19, 1931 |
| 303,787 | Great Britain | Nov. 21, 1928 |

OTHER REFERENCES

Hardy and Perrin Text, The Principles of Optics, McGraw-Hill Co., New York, 1932, pages 87, 104, 105, 110, 117, 446, 477.

Certificate of Correction

Patent No. 2,424,283.    July 22, 1947.

JOHN R. MILES

It is hereby certified that errors appear in the printed specification of the above numbered patent requiring correction as follows: Column 3, line 2, for the patent number "2,417,942" read *2,419,151*; column 8, line 67, for "distances" read *distance s*; column 10, line 36, for the word "resulting" read *resolving*; column 13, line 39, insert a hyphen between "double" and "truncated"; column 14, line 6, strike out "where $f_0$ is the objective's focal length," and insert the same after "member," and before "the front" in line 7; column 19, line 19, for "as" before "reduces" read *so*; line 27, for "so small that" read *whereby*; line 28, for "whereby" read *so small that*; line 30, strike out the semicolon after "length" and insert instead a comma; line 32, strike out the comma after "reduced" and insert instead a semicolon; line 48, strike out the comma after "$f_0$"; and that the said Letters Patent should be read with these corrections therein that the same may conform to the record of the case in the Patent Office.

Signed and sealed this 18th day of November, A. D. 1947.

[SEAL]

THOMAS F. MURPHY,
*Assistant Commissioner of Patents.*